United States Patent
Bögert et al.

(10) Patent No.: US 7,340,923 B2
(45) Date of Patent: Mar. 11, 2008

(54) PRESSING PLUNGER MECHANISM FOR A GLASSWARE FORMING MACHINE

(75) Inventors: Hermann Bögert, Auetal (DE);
Waldemar Kässner, Auetal (DE);
Norbert Monden, Auetal (DE)

(73) Assignee: Heye International GmbH, Obernkirchen (DE)

( * ) Notice: Subject to any disclaimer, the term of this patent is extended or adjusted under 35 U.S.C. 154(b) by 378 days.

(21) Appl. No.: 10/523,350

(22) PCT Filed: May 3, 2003

(86) PCT No.: PCT/EP03/04659

§ 371 (c)(1),
(2), (4) Date: Jan. 28, 2005

(87) PCT Pub. No.: WO2004/018371

PCT Pub. Date: Mar. 4, 2004

(65) Prior Publication Data

US 2005/0252245 A1   Nov. 17, 2005

(30) Foreign Application Priority Data

Jul. 31, 2002  (DE) .......................... 202 11 783 U (51) Int. Cl.
*C03B 11/06* (2006.01)

(52) U.S. Cl. ......................................... 65/362; 65/305

(58) Field of Classification Search ................ 65/362, 65/305; 227/140, 15, 107; 74/10.8, 841, 74/10.85, 840, 10 R, 813 R
See application file for complete search history.

(56) References Cited

U.S. PATENT DOCUMENTS

| 1,385,970 | A | * | 7/1921 | Norton | 74/425 |
| 1,660,125 | A | * | 2/1928 | Hanford | 65/76 |
| 1,689,975 | A | * | 10/1928 | Sloan | 65/224 |
| 1,976,239 | A | * | 10/1934 | Lorenz et al. | 65/224 |
| 2,130,979 | A | * | 9/1938 | Herbert | 74/397 |
| 3,714,924 | A | * | 2/1973 | Jankowski et al. | 116/232 |
| 4,125,057 | A | * | 11/1978 | Cox | 409/74 |
| 4,272,273 | A | | 6/1981 | Trahan et al. | 65/167 |
| 4,659,357 | A | | 4/1987 | Doud | 65/83 |
| 5,411,564 | A | * | 5/1995 | Bolin | 65/68 |
| 6,170,294 | B1 | * | 1/2001 | Mann et al. | 65/171 |
| 6,397,635 | B1 | * | 6/2002 | Sasso et al. | 65/160 |

FOREIGN PATENT DOCUMENTS

| DE | 30 40 762 C2 | 10/1980 |
| DE | G 92 12 648.0 | 9/1992 |
| DE | 197 35 296 C2 | 8/1997 |
| EP | 0 789 004 A2 | 8/1997 |
| EP | 0 919 525 A2 | 6/1999 |
| GB | 668983 | 3/1952 |

\* cited by examiner

*Primary Examiner*—DeMaris R. Wilson
(74) *Attorney, Agent, or Firm*—Synnestvedt & Lechner LLP (57) ABSTRACT

A pressing plunger mechanism for a glassware forming machine has at least one pressing plunger which in normal operation can be moved axially in a reciprocating manner together with a pressing plunger receiver between an inoperative position and a pressing position. A piston rod of a piston is fastened to each pressing plunger receiver, which piston can be displaced in a cylinder of a pressing plunger holder. The pressing plunger holder can be moved axially in a reciprocating manner by a first drive and is connected in a non-rotatable manner to a threaded spindle. A nut which can be rotationally driven by the first drive is engaged with the threaded spindle and is coupled to a driven shaft of an angular gear. An input shaft of the angular gear can be rotationally driven by an electric servo motor of the first drive.

31 Claims, 6 Drawing Sheets

PRESSING PLUNGER MECHANISM FOR A GLASSWARE FORMING MACHINE

FIELD OF THE INVENTION

The invention relates to a pressing plunger mechanism for a glassware forming machine.

BACKGROUND OF THE INVENTION

In the case of a known pressing plunger mechanism as disclosed in DE 30 40 762 C2 of the applicant the pressing plunger holders are driven by a crank gear (column 6, lines 22 and 23). This construction is expensive and takes up a large amount of space in the glassware forming machine.

An alternative type of drive for the pressing plunger holders is known from U.S. Pat. No. 5,411,564. These pressing plungers are accordingly each moved axially in a reciprocating manner by a piston-cylinder unit between a pressing and an inoperative position. This pressure medium drive is supported by a first housing which is disposed so that it can be adjusted with respect to a machine frame in parallel with the longitudinal direction of the pressing plungers by means of a further drive formed as a spindle drive. This latter-named spindle drive is formed by a plurality of threaded spindles extending in parallel with each other, which are engaged with spindle nuts disposed in a non-rotatable manner in a base of the housing, which are united on the input side by a gear mechanism and which are connected to a drive. However, precise movement control with a pressure medium drive is barely possible or is only possible at great expense.

SUMMARY AND OBJECTS OF THE INVENTION

It is the object of the invention to simplify and to render more precise the linear drive of the pressing plungers while taking up a small amount of space.

This object is achieved by using a plunger holder connected to a threaded spindle in a non-rotatable manner, the pressing plunger being mounted on a piston rod of a piston and cylinder of the holder displaceable by a compressed fluid. Compressed air in particular is considered as the compressed fluid acting upon the pistons. In this way the pressing plunger can be constantly pretensioned in the direction of its pressing position. An elastic pad is thus provided for the pressing position of the pressing plunger and effects a pressing force limitation. By means of the threaded spindle any desired axial position of the pressing plunger can be approached very precisely and rapidly. These positions are, for example, the inoperative position, the pressing position and a loading position therebetween, which are all known per se. The construction height of the pressing plunger mechanism can be desirably reduced by the angular gear.

A second drive serves for basic axial adjustment of the pressing plungers for adaptation to the glass vessels to be produced on the glassware forming machine.

A play-free elastic coupling disposed between the angular gear and a servo-motor serve for controlled movement of the pressing plunger. Preferably the driven shaft of the angular gear is disposed coaxially with the threaded spindle and has a concentric space which receives a free end of the threaded spindle with radial clearance all around. This construction provides a reliable rotary drive for the nut is obtained with a low construction height.

When the pressing plunger mechanism has a plurality of pressing plungers all of the pressing plunger holders are fastened to a common traverse, which serves to simplify the structure and construction of the mechanism.

Each pressing plunger and its pressing plunger receiver can be coupled to each other by a longitudinally divided split ring to prevent undesired opening of the coupling rings in a simple manner.

In order to determine the axial position of the pressing plunger extremely precisely and by simple means, a displacement pick-up is fastened to a first housing in parallel with the piston rod. An actuating element for the displacement pick-up is fastened to the piston rod, and, by means of the displacement pick-up, electrical signals corresponding to the axial position of the associated pressing plunger can be input into an evaluation circuit. The maximum penetration depth of the pressing plunger into the glass gob in the pre-mould is of particular interest. The size of the mass of the glass gob can be determined therefrom. The positional signals can be used to regulate the gob mass.

The piston rod can be secured against rotation by fastening a radially extending collar to each piston rod. The collar engages, by means of an axially parallel orifice, around an axially parallel pin of the pressing plunger holder.

The actuating element for the displacement pick-up is fastened to the collar to simplify the construction.

The formation of the second drive using an axially fixed toothed ring having an inner thread that engages a projection of the first housing having an outer thread, the toothed ring meshing with a toothed wheel also serves this purpose.

Construction is further simplified by using a worm gear to reciprocally drive the toothed wheel.

The basic axial adjustment of the pressing plungers achieved by the second drive can be fixed in a simple and effective manner using a clamping device which is fastened to the second housing and cooperates with a support cylinder.

Disposing a first displaceable housing within a second housing fixed on the glassware forming machine, is particularly advantageous in structural terms.

By using two guide rods which are disposed at a lateral spaced disposition from each other and are fastened to the second housing in parallel with the longitudinal axis of the pressing plunger extremely stable and precise longitudinal guidance is provided both for the traverse and also for the first housing.

By using a telescoping supply pipe a supply of cooling air to the pressing plungers and a supply of compressed fluid to the pistons and cylinders of the pressing plunger holders is ensured in an extremely operationally reliable and constructionally simple manner. These flowable media can be supplied in any manner to the supply pipes through the machine bed. The further conveyance of these media from the end of the telescopic pipes takes place respectively in a suitable manner via a duct system.

The supply and telescopic pipes are protected against mechanical damage and against tipping with respect to each other by disposing them between the guide rods.

BRIEF DESCRIPTION OF THE DRAWINGS

These and further features and advantages of the invention are explained in more detail hereinunder with the aid of the exemplified embodiment illustrated in the drawings in which.

DETAILED DESCRIPTION

Figure 1:
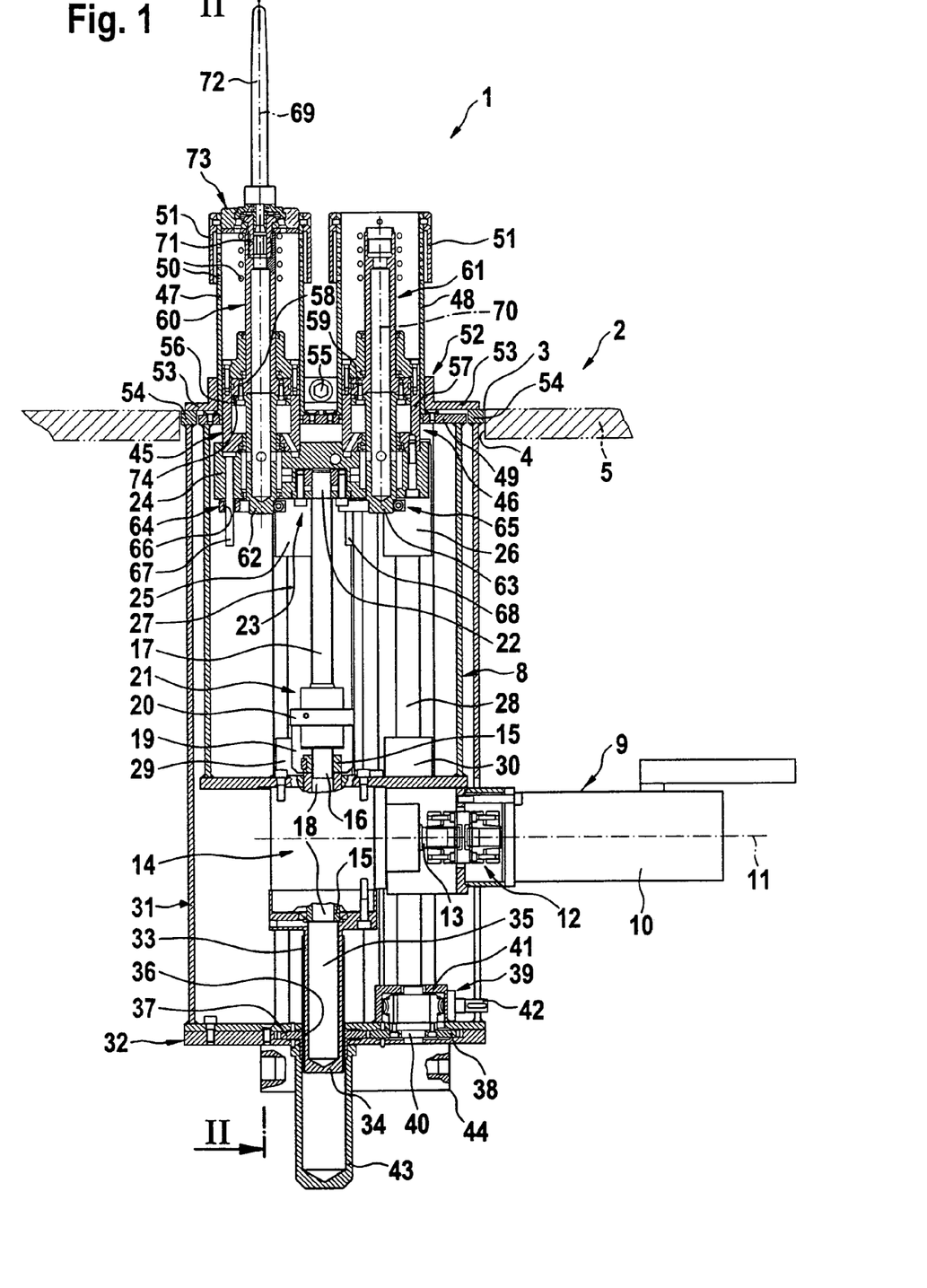
FIG. 1 shows a longitudinal cross-sectional view through a pressing plunger mechanism at line I-I in FIG. 2.

FIG. 1 shows a pressing plunger mechanism 1 of a glassware forming machine 2, this can be, for example, a section of an I.S. glassware forming machine. The glassware forming machine 2 operates in the illustrated exemplified embodiment in so-called double gob operation, wherein in each case two glass vessels are produced at the same time.

The pressing plunger mechanism 1 is inserted with a sealing gap 3 into an orifice 4 in an upper plate 5 of the glassware forming machine 2. In accordance with FIG. 2 the pressing plunger mechanism 1 is screwed at the bottom to a head plate 6 of a machine bed 7.

In accordance with FIG. 1 the pressing plunger mechanism 1 has a first housing 8 which supports a first drive 9. The first drive 9 has an electric servo motor 10 with a horizontal longitudinal axis 11, which is connected to an input shaft 13 of an angular gear 14 via a play-free elastic coupling 12.

A driven shaft 15 of the angular gear 14 has a space 18 receiving a free end 16 of a coaxial threaded spindle 17 with radial clearance all around. The driven shaft 15 is connected in a non-rotatable manner to a cup-shaped intermediate piece 19, the end of this intermediate piece which is uppermost in FIG. 1 being screwed to an outer flange 20 of a nut 21. The nut 21 which can be rotationally driven by the first drive 9 is engaged with the threaded spindle 17.

Figure 4:
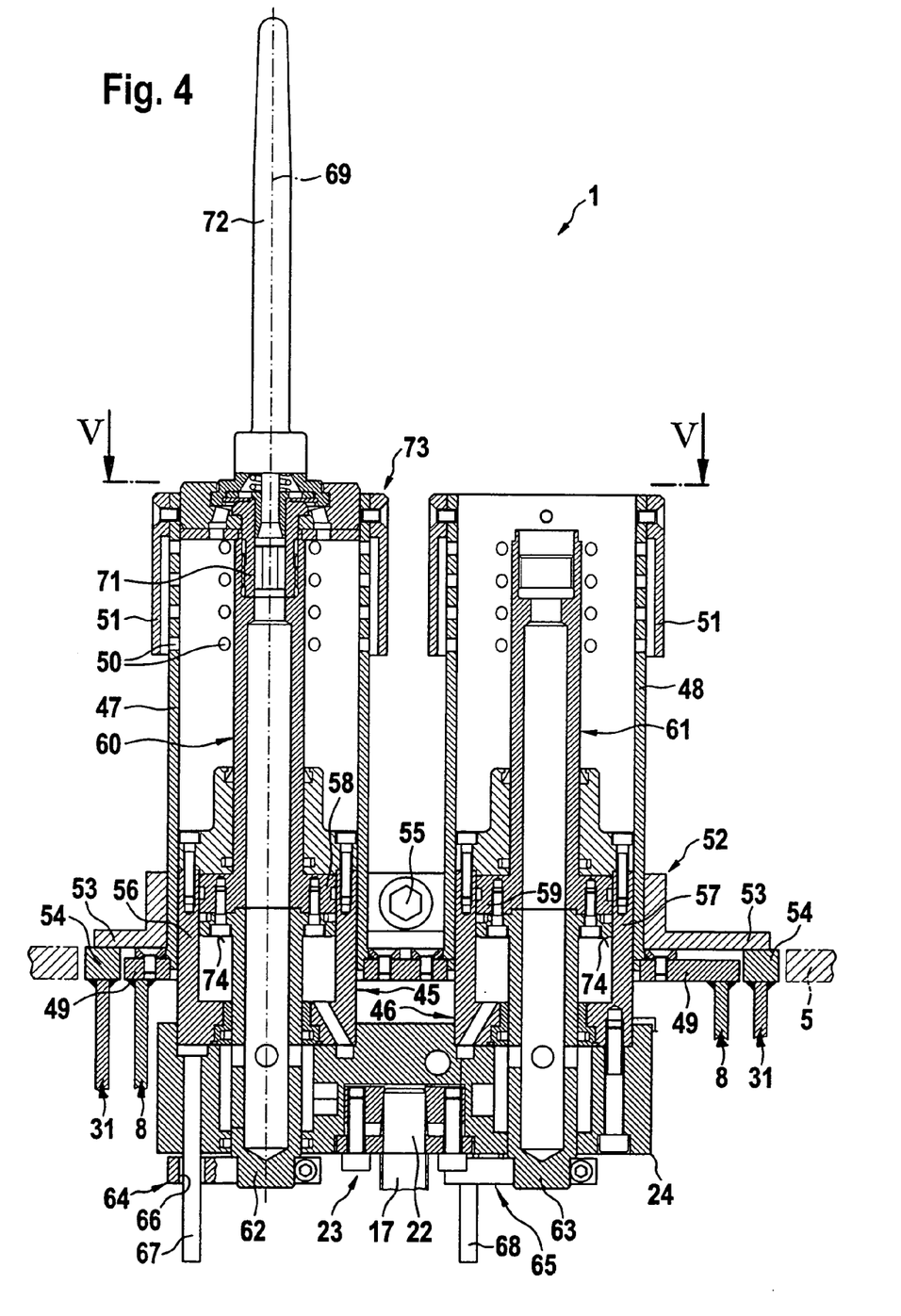
FIG. 4 shows the upper region of FIG. 1 on an enlarged scale.

As shown more precisely by FIG. 4 an upper end 22 of the threaded spindle 17 is connected in a non-rotatable manner to a traverse 24 by means of a clamping set 23.

The traverse 24 is guided by means of guide bushings 25 and 26 in a non-rotatable but displaceable manner on mutually parallel guide rods 27 and 28. The first housing 8 is also guided in a non-rotatable and displaceable manner via such guide bushings 29 and 30 on the guide rods 27, 28.

Figure 2:
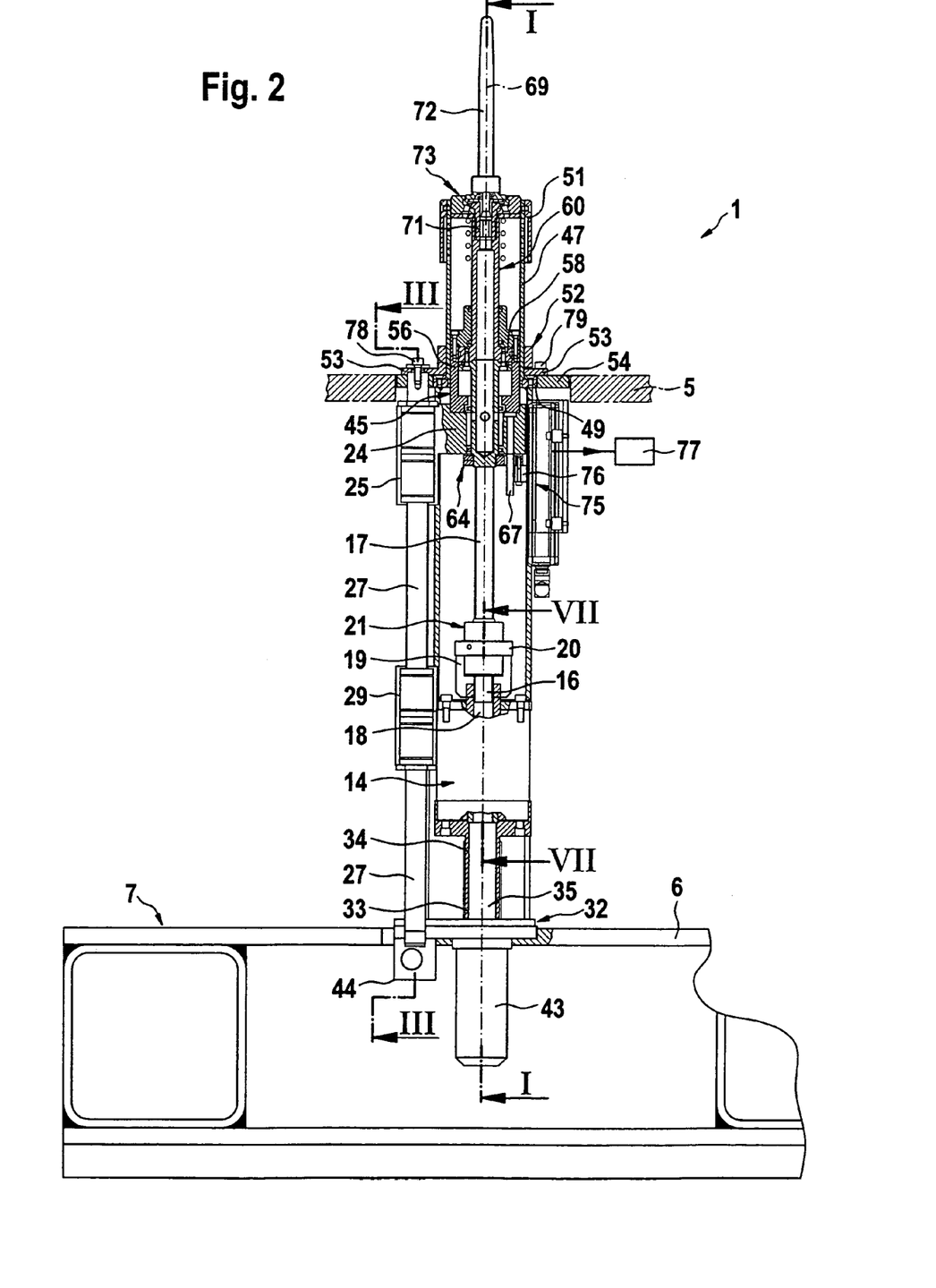
FIG. 2 shows the cross-sectional view at line II-II in FIG. 1.

The first housing 8 is surrounded at a spaced disposition by a second housing 31, the base 32 of which is fastened in accordance with FIG. 2 to the head plate 6. The second housing 31 extends upwards into the aperture 4.

The first housing 8 has, at the bottom, a projection 34 provided with an outer thread 33. The projection 34 is provided with an aperture 35 which is aligned with the space 18, into which aperture the free end 16 of the threaded spindle 17 can pass. The projection 34 extends through the base 32 and with its outer thread 33 engages with an inner thread 36 of a toothed ring 37. The toothed ring 37 is held in the base 32 in an axially fixed but rotatable manner. The toothed ring 37 meshes with a toothed wheel 38 which is attached to a driven shaft 40 of a second drive 39. The second drive 39 has a worm gear 41, the input shaft 42 of which can be manually rotated in a reciprocating manner via a connection linkage which is not shown and is known per se. Rotation of this type means that the first housing 8 undergoes a basic height adjustment with respect to the second housing 31, this height adjustment being determined by the type of glass vessel to be respectively produced by the glassware forming machine 2.

The projection 34 passes into a protective cap 43 which is fastened to the underside of the base 32. Laterally next to the protective cap 43 a connection block 44 for the supply of cooling air and of a compressed fluid is also fastened to the underside of the base 32, as will be explained hereinunder.

Figure 5:
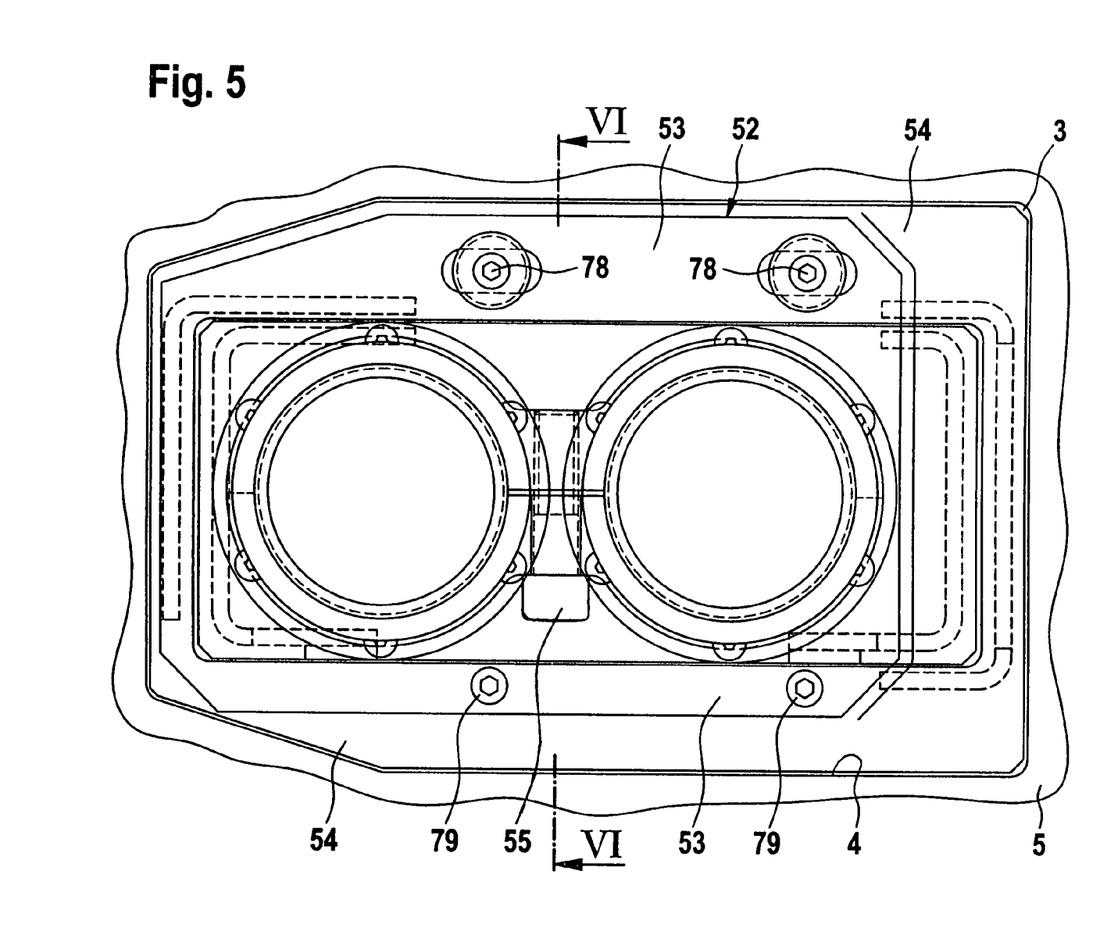
FIG. 5 shows essentially the view at line V-V in FIG. 4.
Figure 6:
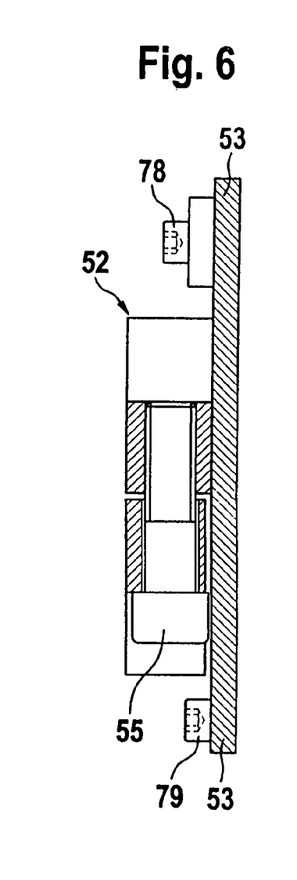
FIG. 6 shows the cross-sectional view at line VI-VI in FIG. 5

From the traverse 24 extend pressing plunger holders 45 and 46 upwards into a respective support cylinder 47 and 48. Each support cylinder 47, 48 is screwed at the bottom to a head plate 49 of the first housing 8 and at the top to outlet bores 50 for used cooling air. A cover apron 51 covering the upper portion with the outlet bores 50 serves on the one hand as a sound damper for the expelled waste air and on the other hand prevents the accumulation of dirt. The support cylinders 47, 48 are surrounded by a spectacle-like clamping device 52 which, as shown in detail in FIGS. 5 and 6, is screwed via a horizontal flange 53 to a head plate 54 of the second housing 31. When a central clamping screw 55 of the clamping device 52 is released, the support cylinders 47, 48 together with their contents, the first housing 8 and the first drive 9 are adjusted in height by the second drive 39 until the basic height adjustment required for the respective glass vessel is achieved. Then the clamping screw 55 is tightened and thus fixes the basic height adjustment. In accordance with FIG. 2 the second housing 31 is supported firmly against the machine on the head plate 6 and does not change position in terms of height.

Each pressing plunger holder 45, 46 has a cylinder 56 and 57 in which a piston 58 and 59 can be displaced in a sealed manner. From the piston 58, 59 a piston rod 60 and 61 extends out of the cylinder 56, 57 on both sides. A lower end 62 and 63 of the piston rods 60, 61 is constantly located below the traverse 24 and at that location supports a horizontally extending collar 64 and 65. Each collar 64, 65 engages, by means of an axially parallel orifice 66, around an axially parallel pin 67 and 68 of the pressing plunger holder 45, 46. In this way the piston rods 60, 61 are prevented from rotating about their longitudinal axis 69, 70.

At the top, each piston rod supports a pressing plunger receiver 71 with which a pressing plunger 72 which is coaxial to the piston rod 60, 61 can be coupled by means of a longitudinally divided split ring 73. As shown in FIG. 1 the closed split ring 73 is supported in the radial direction by the associated support cylinder 47, 48. This is also true for all axial operating and inoperative positions of the pressing plunger 72, wherein in FIG. 1 the uppermost end operating position of the pressing plunger 72 is shown. This uppermost end operating position is rarely if ever reached by the pressing plunger 72 during operation. For this purpose a piston surface 74 facing away from the pressing plunger 72 is constantly acted upon by a compressed fluid, preferably compressed air at 0.8 to 2.5 bar.

In each working cycle the first drive 9 ensures that the traverse 24 and with it the pressing plunger holders 45, 46 always adopt a lower inoperative position, a middle loading position and an upper pressing position. If now a glass gob of excessively large mass is located in the closed pre-mould (not shown), the pressing plunger 72 cannot reach its uppermost end operating position 7 shown in FIG. 1. The piston, e.g. 58, is then displaced with its piston rod 60 against the pressure of the compressed fluid relative to the cylinder 56. In this way an effective pressing force limitation is achieved. If, on the other hand, a glass gob of excessively small mass enters the pre-mould, the pressing plunger 72 moves into its uppermost end operating position shown in FIG. 1.

If the pressing plunger 72 has to be changed, the pressing plunger holder 45, 46 can be moved upwards by the first drive 9 beyond the uppermost end operating position shown in FIG. 1 until the split ring 73 protrudes upwards out of its support cylinder 47, 48. In this axial mounting position the split ring 73 can be opened and the pressing plunger 72 can be changed. The split ring 73 is then closed and moved down into its support cylinder 47, 48.

These two states of excessively large or small glass masses of the glass gob are determined by displacement pick-ups 75 in accordance with FIG. 2. The displacement pick-ups 75 are fastened to the first housing 8 in parallel with the associated piston rod 60, 61. An actuating element 76 for the displacement pick-up 75 is screwed to the respective collar 64, 65. In this way by means of the displacement pick-up 75 electrical signals corresponding to the axial position of the associated pressing plunger 72 can be input into an evaluation circuit 77. Thus in a manner which is known per se the mass of the glass gobs can be regulated by the evaluation circuit 77.

FIG. 2 also shows that the flange 53 of the clamping device 52 is fastened on the one hand in each case by means of a screw 78 to the upper end of the guide rods 27, 28 and on the other hand with screws 79 to the head plate 54.

Figure 3:
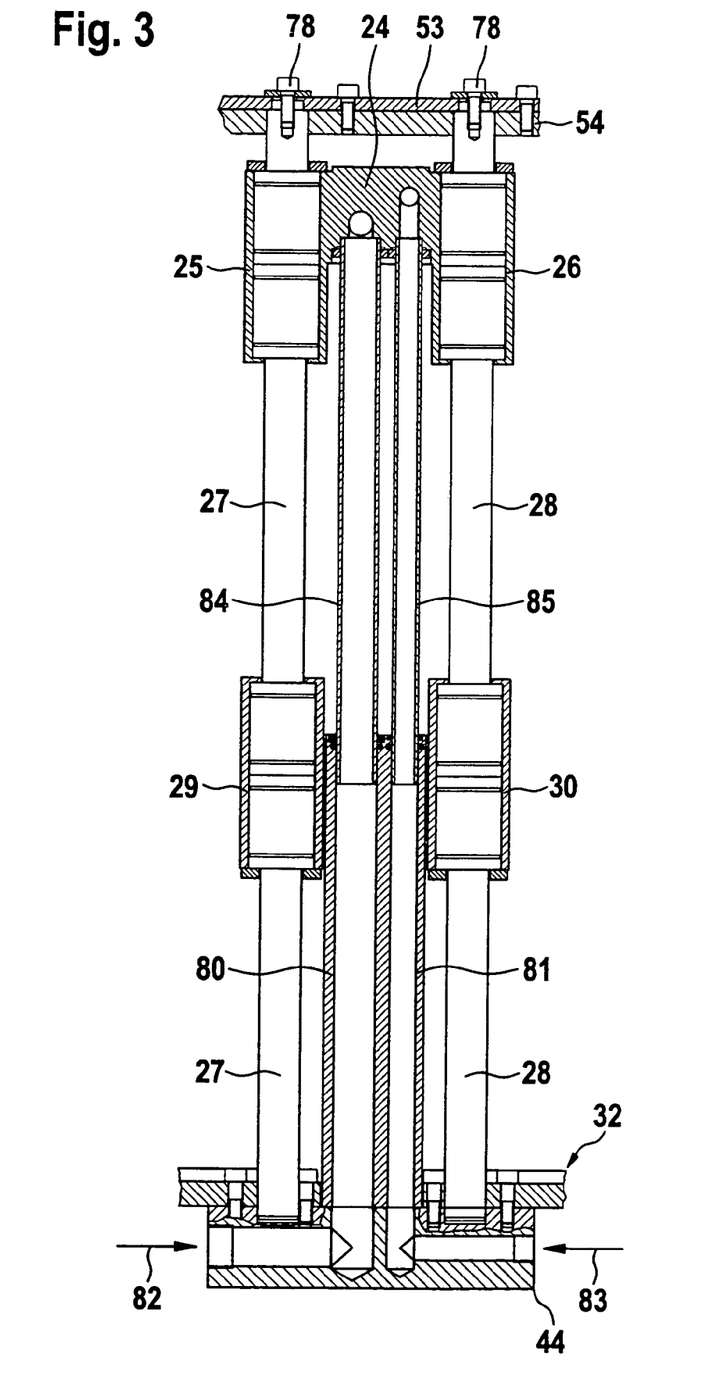
FIG. 3 shows the cross-sectional view at line III-III in FIG. 2 on an enlarged scale.

In accordance with FIG. 3 supply pipes 80 and 81 formed as one piece with each other are fastened in parallel with the longitudinal axis 69 (FIG. 1) to the base 32 of the second housing 31. The supply pipe 80 is supplied with cooling air for the pressing plunger 72 through the connection block 44 in the direction of an arrow 82.

In a corresponding manner a compressed fluid, in particular compressed air, is supplied to the supply pipe 81 through the connection block 44 in the direction of an arrow 83, in order to act upon the piston surface 74 (FIG. 1). A telescopic pipe 84 and 85 fastened to the traverse 24 passes into each supply pipe 80, 81 in a sealed manner. The upper end of the telescopic pipe 84 issues into a duct system which extends from the traverse 24 through the hollow piston rod 60, 61 into the pressing plunger 72. The upper end of the telescopic pipe 85 issues into a further duct system which leads through the traverse 24 into the cylinder 56, 57.

FIG. 4 shows the upper region of FIG. 1 on a larger scale for clarification.

FIGS. 5 and 6 show details of the formation of the head plate 54 and of the clamping device 52.

Figure 7:
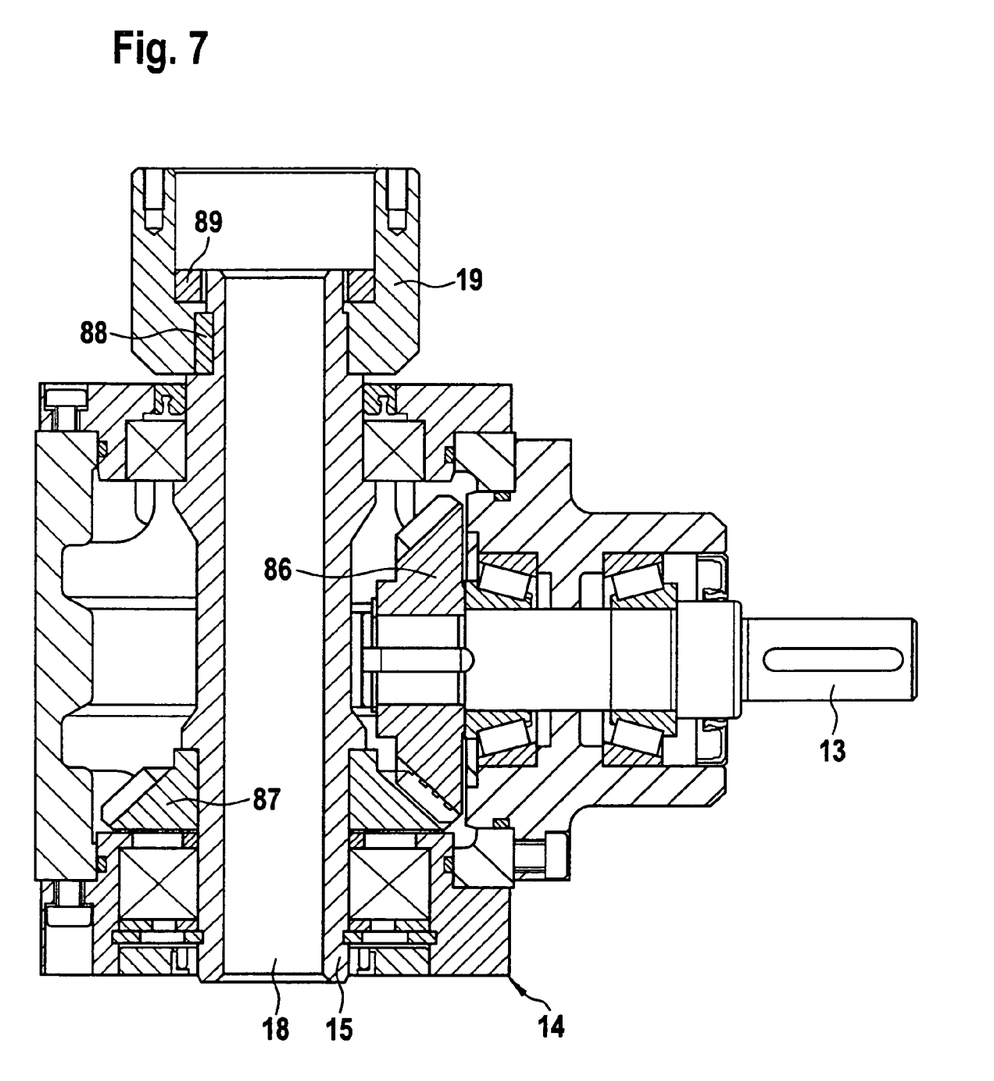
FIG. 7 shows the cross-sectional view at line VII-VII in FIG. 2 on an enlarged scale.

FIG. 7 clarifies details of the angular gear 14. The input shaft 13 drives a first bevel wheel 86 which meshes with a second bevel wheel 87 on the driven shaft 15. The intermediate piece 19 is connected in a non-rotatable manner to the upper end of the driven shaft 15 via a feather key 88 and is fixed in the axial direction on the driven shaft 15 by means of a nut 89.

The invention claimed is:

1. A pressing plunger mechanism for a glassware forming machine, said pressing plunger mechanism comprising:
   a fixed housing mountable on said glassware forming machine;
   a movable housing mounted on said fixed housing;
   a plunger holder movably mounted on said movable housing;
   a drive unit mounted on said movable housing, said drive unit comprising a threaded spindle fixedly attached to said plunger holder, a nut engaged with said spindle, said nut being coupled to a driven shaft, said driven shaft having a first bevel gear mounted thereon, said first bevel gear engaging a second bevel gear mounted on a drive shaft of an electric motor, rotation of said drive shaft of said electric motor rotating said nut and thereby moving said fixed spindle in a lengthwise direction, lengthwise motion of said spindle moving said plunger holder relatively to said movable housing from a lower inoperative position to an upper pressing printer during a working cycle; and
   a pressing plunger supported on said plunger holder.

2. A pressing plunger mechanism according to claim 1, further comprising an elastic coupling is disposed between said drive shaft and said second bevel gear.

3. A pressing plunger mechanism according to claim 2, wherein said driven shaft is oriented coaxially with said threaded spindle, said threaded spindle having a free end, said driven shaft having a concentric space which receives said free end of said threaded spindle.

4. A pressing plunger mechanism according to claim 2, further comprising:
   a plurality of pressing plunger holders, each having a pressing plunger mounted thereon; and
   a traverse fixedly attached to said threaded spindle, said pressing plunger holders being mounted on said traverse.

5. A pressing plunger mechanism according to claim 1, wherein said driven shaft is oriented coaxially with said threaded spindle, said threaded spindle having a free end, said driven shaft having a concentric space which receives said free end of said threaded spindle.

6. A pressing plunger mechanism according to claim 5, further comprising:
   a plurality of pressing plunger holders, each having a pressing plunger mounted thereon; and
   a traverse fixedly attached to said threaded spindle, said pressing plunger holders being mounted on said traverse.

7. A pressing plunger mechanism according to claim 5, further comprising:
   a cylinder and piston assembly mounted on said plunger holder, said piston having a piston rod and being movable within said cylinder relatively to said plunger holder, said pressing plunger being mounted on said piston rod;
   a receiver and a longitudinally divided split ring, said receiver being mounted on said piston, said pressing plunger being coupled to said receiver by said split ring; and
   a support cylinder mounted on said movable housing, said split ring being movable within and radially supported by said support cylinder.

8. A pressing plunger mechanism according to claim 1, further comprising:
   a plurality of pressing plunger holders, each having a pressing plunger mounted thereon; and
   a traverse fixedly attached to said threaded spindle, said pressing plunger holders being mounted on said traverse.

9. A pressing plunger mechanism according to claim 8, further comprising:
   a plurality of cylinder and piston assemblies, each assembly being mounted on a respective pressing plunger holder, each piston having a respective piston rod and being movable within a respective cylinder relative to one of said plunger holders, each of said pressing plungers being mounted on a respective piston rod;
   a receiver and a longitudinally divided split ring, said receiver being mounted on said piston, said pressing plunger being coupled to said receiver by said split ring; and
   a support cylinder mounted on said movable housing, said split ring being movable within and radially supported by said support cylinder.

10. A pressing plunger according to claim 9, further comprising a clamping device mounted on said fixed housing and engageable with said support cylinder on said movable housing for fixing the position of said movable housing relatively to said fixed housing, said movable housing being movable substantially along the entire length of said support cylinder.

11. A pressing plunger mechanism according to claim 10, wherein said movable housing is disposed within said fixed housing.

12. A pressing plunger mechanism according to claim 11, further comprising:
- first and second guide rods attached to said fixed housing in spaced apart relation, said guide rods being oriented substantially parallel to said threaded spindle; and
- first and second guide bushings mounted on said movable housing and engaging said first and second guide rods respectively, said guide bushings cooperating with said guide rods for guiding motion of said movable housing relatively to said fixed housing.

13. A pressing plunger mechanism according to claim 10, further comprising:
- first and second guide rods attached to said fixed housing in spaced apart relation, said guide rods being oriented substantially parallel to said threaded spindle; and
- first and second guide bushings mounted on said movable housing and engaging said first and second guide rods respectively, said guide bushings cooperating with said guide rods for guiding motion of said movable housing relatively to said fixed housing.

14. A pressing plunger mechanism according to claim 13, further comprising:
- a cylinder and piston assembly mounted on said plunger holder, said piston having a piston rod and being movable within said cylinder relatively to said plunger holder, said pressing plunger being mounted on said piston rod;
- a cooling air pipe mounted on said fixed housing;
- a compressed fluid pipe mounted on said fixed housing;
- a cooling air extension pipe attached to said traverse and telescopically engaging said cooling air pipe;
- a compressed fluid extension pipe attached to said traverse and telescopically engaging said compressed fluid pipe, wherein:
  - said cooling air extension pipe is arranged to provide cooling air to said pressing plunger and said compressed fluid extension pipe is in fluid communication with said cylinder for pretensioning said piston therein.

15. A pressing plunger mechanism according to claim 14, wherein at least one of said cooling air pipe and said compressed fluid pipe is mounted between said guide rods.

16. A pressing plunger mechanism according to claim 8, further comprising:
- a cylinder and piston assembly mounted on said plunger holder, said piston having a piston rod and being movable within said cylinder relatively to said plunger holder, said pressing plunger being mounted on said piston rod;
- a pin mounted on one of said plunger holders and oriented substantially parallel to said threaded spindle; and
- a radially extending collar attached to said piston rod, said collar having an orifice receiving said pin for guiding axial motion of said piston.

17. A pressing plunger mechanism according to claim 16, further comprising:
- a cylinder and piston assembly mounted on said plunger holder, said piston having a piston rod and being movable within said cylinder relatively to said plunger holder, said pressing plunger being mounted on said piston rod;
- a cooling air pipe mounted on said fixed housing;
- a compressed fluid pipe mounted on said fixed housing;
- a cooling air extension pipe attached to said traverse and telescopically engaging said cooling air pipe;
- a compressed fluid extension pipe attached to said traverse and telescopically engaging said compressed fluid pipe, wherein:
  - said cooling air extension pipe is arranged to provide cooling air to said pressing plunger and said compressed fluid extension pipe is in fluid communication with said cylinder for pretensioning said piston therein.

18. A pressing plunger mechanism according to claim 8, further comprising:
- a second drive unit mounted on said fixed housing, said second drive unit comprising a motor and a toothed wheel rotatable by said motor;
- a toothed ring rotatably mounted on said fixed housing, said toothed ring having a threaded inner diameter, said toothed ring engaging said toothed wheel; and
- a threaded projection extending from said movable housing and engaging said threaded inner diameter of said toothed ring, rotation of said toothed wheel by said motor rotating said toothed ring and thereby moving said movable housing in a direction lengthwise along said projection.

19. A pressing plunger mechanism according to claim 8, further comprising:
- a cylinder and piston assembly mounted on said plunger holder, said piston having a piston rod and being movable within said cylinder relatively to said plunger holder, said pressing plunger being mounted on said piston rod;
- a cooling air pipe mounted on said fixed housing;
- a compressed fluid pipe mounted on said fixed housing;
- a cooling air extension pipe attached to said traverse and telescopically engaging said cooling air pipe;
- a compressed fluid extension pipe attached to said traverse and telescopically engaging said compressed fluid pipe, wherein:
  - said cooling air extension pipe is arranged to provide cooling air to said pressing plunger and said compressed fluid extension pipe is in fluid communication with said cylinder for pretensioning said piston therein.

20. A pressing plunger mechanism according to claim 1, further comprising:
- a cylinder and piston assembly mounted on said plunger holder, said piston having a piston rod and being movable within said cylinder relatively to said plunger holder, said pressing plunger being mounted on said piston rod;
- a receiver and a longitudinally divided split ring, said receiver being mounted on said piston, said pressing plunger being coupled to said receiver by said split ring; and
- a support cylinder mounted on said movable housing, said split ring being movable within and radially supported by said support cylinder.

21. A pressing plunger mechanism according to claim 20, further comprising:
- a cylinder and piston assembly mounted on said plunger holder, said piston having a piston rod and being movable within said cylinder relatively to said plunger holder, said pressing plunger being mounted on said piston rod;
- an evaluation circuit for determining an axial position of said pressing plunger;
- a displacement pick-up mounted on said movable housing, said displacement pick-up being in communication with said evaluation circuit; and an actuating element mounted on said piston rod, said actuating element cooperating with said displacement pick-up for determining said position of said piston for input thereof into said evaluation circuit.

22. A pressing plunger mechanism according to claim 21, further comprising:
a cylinder and piston assembly mounted on said plunger holder, said piston having a piston rod and being movable within said cylinder relatively to said plunger holder, said pressing plunger being mounted on said piston rod;
a pin mounted on said plunger holder and oriented substantially parallel to said threaded spindle; and
a radially extending collar attached to said piston rod, said collar having an orifice receiving said pin for guiding axial motion of said piston.

23. A pressing plunger mechanism according to claim 21, further comprising:
a second drive unit mounted on said fixed housing, said second drive unit comprising a motor and a toothed wheel rotatable by said motor;
a toothed ring rotatably mounted on said fixed housing, said toothed ring having a threaded inner diameter, said toothed ring engaging said toothed wheel; and
a threaded projection extending from said movable housing and engaging said threaded inner diameter of said toothed ring, rotation of said toothed wheel by said motor rotating said toothed ring and thereby moving said movable housing in a direction lengthwise along said projection.

24. A pressing plunger according to claim 21, further comprising a clamping device mounted on said fixed housing and engageable with said support cylinder on said movable housing for fixing the position of said movable housing relatively to said fixed housing, said movable housing being movable substantially along the entire length of said support cylinder.

25. A pressing plunger mechanism according to claim 20, further comprising:
a cylinder and piston assembly mounted on said plunger holder, said piston having a piston rod and being movable within said cylinder relatively to said plunger holder, said pressing plunger being mounted on said piston rod;
a pin mounted on said plunger holder and oriented substantially parallel to said threaded spindle; and
a radially extending collar attached to said piston rod, said collar having an orifice receiving said pin for guiding axial motion of said piston.

26. A pressing plunger mechanism according to claim 20, further comprising:
a second drive unit mounted on said fixed housing, said second drive unit comprising a motor and a toothed wheel rotatable by said motor;
a toothed ring rotatably mounted on said fixed housing, said toothed ring having a threaded inner diameter, said toothed ring engaging said toothed wheel; and
a threaded projection extending from said movable housing and engaging said threaded inner diameter of said toothed ring, rotation of said toothed wheel by said motor rotating said toothed ring and thereby moving said movable housing in a direction lengthwise along said projection.

27. A pressing plunger mechanism according to claim 1, further comprising:
a cylinder and piston assembly mounted on said plunger holder, said piston having a piston rod and being movable within said cylinder relatively to said plunger holder, said pressing plunger being mounted on said piston rod;
a pin mounted on said plunger holder and oriented substantially parallel to said threaded spindle; and
a radially extending collar attached to said piston rod, said collar having an orifice receiving said pin for guiding axial motion of said piston.

28. A pressing plunger mechanism according to claim 27, further comprising:
a cylinder and piston assembly mounted on said plunger holder, said piston having a piston rod and being movable within said cylinder relatively to said plunger holder, said pressing plunger being mounted on said piston rod;
an evaluation circuit for determining an axial position of said pressing plunger;
a displacement pick-up mounted on said movable housing, said displacement pick-up being in communication with said evaluation circuit; and
an actuating element mounted on said collar, said actuating element cooperating with said displacement pick-up for determining said position of said piston for input thereof into said evaluation circuit.

29. A pressing plunger mechanism according to claim 28, further comprising:
a second drive unit mounted on said fixed housing, said second drive unit comprising a motor and a toothed wheel rotatable by said motor;
a toothed ring rotatably mounted on said fixed housing, said toothed ring having a threaded inner diameter, said toothed ring engaging said toothed wheel; and
a threaded projection extending from said movable housing and engaging said threaded inner diameter of said toothed ring, rotation of said toothed wheel by said motor rotating said toothed ring and thereby moving said movable housing in a direction lengthwise along said projection.

30. A pressing plunger mechanism according to claim 1, further comprising:
a second drive unit mounted on said fixed housing, said second drive unit comprising a motor and a toothed wheel rotatable by said motor;
a toothed ring rotatably mounted on said fixed housing, said toothed ring having a threaded inner diameter, said toothed ring engaging said toothed wheel; and
a threaded projection extending from said movable housing and engaging said threaded inner diameter of said toothed ring, rotation of said toothed wheel by said motor rotating said toothed ring and thereby moving said movable housing in a direction lengthwise along said projection.

31. A pressing plunger according to claim 30, further comprising a worm gear mounted on a drive shaft of said motor, said worm gear engaging said toothed wheel for rotating said toothed wheel in a reciprocating manner.

* * * * *